C. P. GRONBERG.
RAKING ATTACHMENT FOR HARVESTERS.
No. 24,555. Patented June 28, 1859.
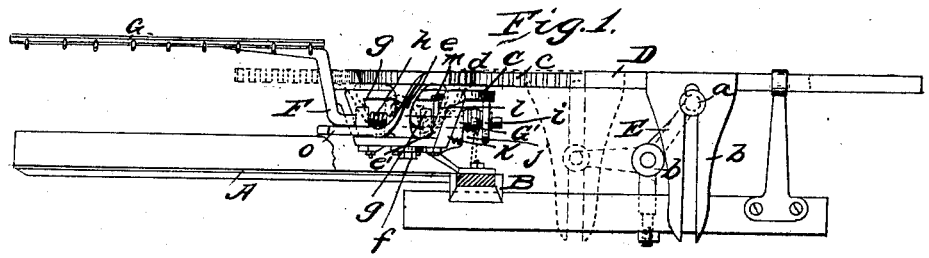
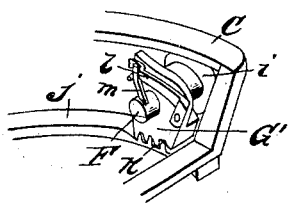
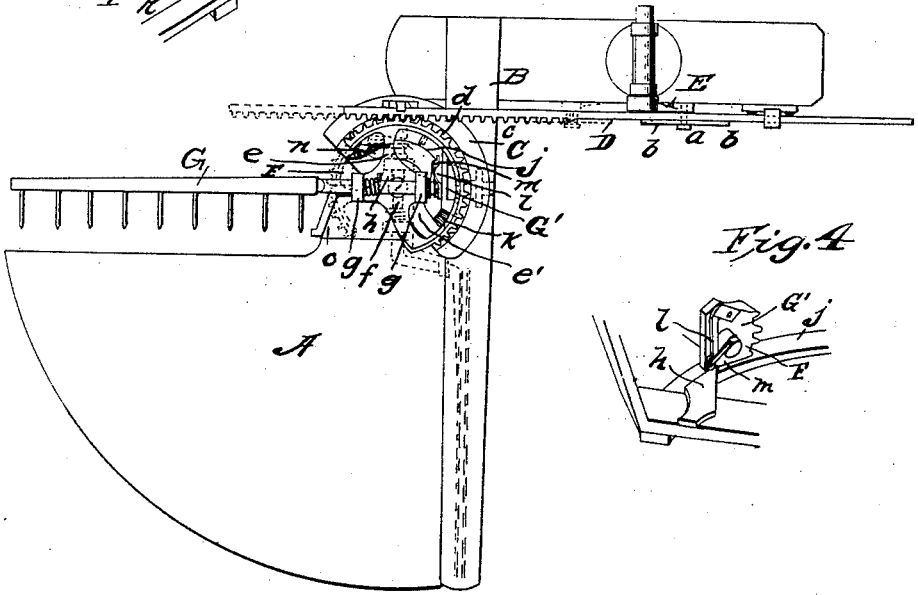
Witnesses:
Inventor
C. P. Gronberg

UNITED STATES PATENT OFFICE.

C. P. GRONBERG, OF MONTGOMERY, ILLINOIS.

IMPROVEMENT IN RAKING ATTACHMENTS FOR HARVESTERS.

Specification forming part of Letters Patent No. 24,555, dated June 28, 1859.

*To all whom it may concern:*

Be it known that I, C. P. GRONBERG, of Montgomery, in the county of Kane and State of Illinois, have invented a new and Improved Raking Attachment for Harvesters; and I do hereby declare that the following is a full, clear, and exact description of the same, reference being had to the accompanying drawings, forming part of this specification, in which—

Figure 1 is a side view of my invention; Fig. 2, a plan or top view of the same; Figs. 3 and 4, detached sectional views in perspective, showing the manner of raising and releasing the rake.

Similar letters of reference indicate corresponding parts in the several figures.

This invention relates to an improvement in that class of raking devices in which a vibrating rake is employed and made to traverse over a sector or quadrant shaped platform.

The invention consists in a novel means employed for operating the rake, as hereinafter fully shown and described, whereby the desired end is attained by a very simple means, and one that may be readily applied or adapted to the generality of harvesters in use.

To enable others skilled in the art to fully understand and construct my invention, I will proceed to describe it.

A represents the platform of a harvester, of sector or quadrant form, and attached to the framing B of the machine in any proper manner.

To the framing B, and at a point near the inner end of the front side of the platform, an elevated semicircular bar, C, is placed, which bar serves as a rest for a rock-bar, D, that receives a reciprocating motion from a crank, E, the pin $a$ of which works between pendants $b$ $b$, attached to said bar D. (See more particularly Fig. 1.) The rack $c$ of the bar D gears into a semicircular tooth-bar, $d$, which is attached to the upper part of a skeleton hub, $e$, the axis $f$ of which is at the bottom of the center of the support $e'$ of the semicircular bar C.

In the skeleton hub $e$ the inner end of a shaft, F, is fitted in bearings $g$ $g$ and allowed to turn freely therein. This shaft F is bent, forming a sort of crank, as shown plainly in Fig. 1, and to its outer part a rake, G, is attached, said rake being constructed in the usual or any proper way. On the inner part of the shaft F a spiral spring, $h$, is placed, which spring has a tendency to keep the outer portion of the shaft in a horizontal plane, with the inner portion and the rake G down on or near to the platform A.

On the inner end of the shaft F a roller, $i$, is placed loosely, and bears against the under side of the semicircular bar C. On said shaft F, and adjoining the roller $i$, a part pinion, G', is placed loosely, and to the lower part of the support $e'$ of the bar C a horizontal semicircular bar, $j$, is attached, said bar being directly under and in the path of the loose part pinion G'. The upper surface of this bar $j$ is smooth nearly its whole length, a few teeth or cogs, $k$, being at its front end, as shown in Figs. 2 and 3.

To one side of the part pinion G' a spring-catch, $l$, is attached, the form of which is shown plainly in Figs. 2 and 3, and to the inner part of the shaft F a projecting arm, $m'$, is attached.

To the support $e'$, and near the end of the semicircular bar $j$, which is opposite to the end where the teeth or cogs $k$ are placed, there is secured a projection, $n$, (see Figs. 2 and 4,) the use of which will be presently seen. To the lower part of the skeleton hub $e$ a projecting arm, $o$, is secured, said arm serving as a bearing for the shaft F when the rake G is depressed or in a position to rake the grain off the platform A.

The operation is as follows: As the machine is drawn along a rotary motion is communicated to the crank E from the driving-wheel of the machine, and said crank E communicates a reciprocating motion to the rack-bar D, and the latter, in connection with the semicircular toothed bar $d$, gives a vibrating motion to the shaft F and rake G, the latter moving or traversing over the platform A. Each time the rake G reaches the termination of its backward movement, or, rather, just previous to said termination, the part pinion G' is brought into gear with the teeth or cogs $k$ of the semicircular bar $j$, and the part pinion G' is turned so that its spring-catch $l$ will catch the end of the arm $m$ on the shaft F, as shown in Figs. 2 and 3, and as the shaft F commences to move forward or toward the front end of the platform the shaft F, in consequence of the part pinion G' gearing into the teeth or cogs $k$ and the connection of said part pinion with the shaft F by means of the spring-catch $l$ and arm $m$, said shaft F is turned and the rake G elevated and retained in an elevated position as it is moved over the platform until it reaches a point over the front part of the platform, at which time the spring-catch $l$ is thrown off the arm $m$ in consequence of said catch coming in contact with the projecting arm $n$ on the semicircular bar $j$, and the rake G falls by the action of the spring $h$, so that during the backward movement of the rake the cut grain will be raked from the platform.

I do not claim a vibrating rake, broadly, nor the devices employed for operating the same; but I do claim as new and desire to secure by Letters Patent—

The peculiar arrangement of the mechanism—namely, the reciprocating rack-bar D and semicircular toothed bar $d$, in connection with the bent rake-shaft E, provided with a spring, $h$, arm $m$, and part pinion G′, and the semicircular bar $j$ on the support $e'$, provided with teeth $k$, and a projecting arm, $n$, for joint operation, substantially as and for the purpose set forth.

C. P. GRONBERG.

Witnesses:
RALPH GRAY,
VIN. A. WATKINS.